United States Patent
Sakamaki et al.

(10) Patent No.: US 10,630,823 B2
(45) Date of Patent: Apr. 21, 2020

(54) PORTABLE TERMINAL

(71) Applicant: SHARP KABUSHIKI KAISHA, Sakai, Osaka (JP)

(72) Inventors: Takuro Sakamaki, Sakai (JP); Yuta Ito, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/099,428

(22) PCT Filed: Mar. 2, 2017

(86) PCT No.: PCT/JP2017/008345
§ 371 (c)(1),
(2) Date: Nov. 6, 2018

(87) PCT Pub. No.: WO2017/195439
PCT Pub. Date: Nov. 16, 2017

(65) Prior Publication Data
US 2019/0149642 A1 May 16, 2019

(30) Foreign Application Priority Data
May 9, 2016 (JP) .................. 2016-094110

(51) Int. Cl.
*H04B 1/38* (2015.01)
*H04M 1/02* (2006.01)
(Continued)

(52) U.S. Cl.
CPC .......... *H04M 1/026* (2013.01); *G06F 1/1626* (2013.01); *G06F 1/1656* (2013.01); *G06F 1/181* (2013.01)

(58) Field of Classification Search
CPC .................. H04M 1/026; G06F 1/181
(Continued)

(56) References Cited

U.S. PATENT DOCUMENTS

2005/0094219 A1* 5/2005 Leu .................... H04N 1/00681
358/474
2008/0203721 A1* 8/2008 Petersson ............ H04M 1/0202
283/99
(Continued)

FOREIGN PATENT DOCUMENTS

JP 2010-519876 A 6/2010
JP 2013-176051 A 9/2013
(Continued)

*Primary Examiner* — Edward F Urban
*Assistant Examiner* — Max Mathew
(74) *Attorney, Agent, or Firm* — ScienBiziP, P.C.

(57) ABSTRACT

An embodiment of the present invention provides a portable terminal which can achieve reduction in thickness of the portable terminal even in a case where the portable terminal includes a display tray that displays identification information. A mobile phone (1A) includes a display sheet (20) displaying a bar code (21), the display sheet (20) being incorporated in a sub-antenna (5). The bar code (21) is viewable to a user when the display sheet (20) is pulled out from the sub-antenna (5). The display sheet (20) is made of a flexible band-shaped sheet member. Further, the mobile phone (1A) includes a sheet guide member (10) for guiding the display sheet (20) along a direction in which the display tray is pulled out, the sheet guide member (10) guiding the display sheet (20) so as to allow the display sheet (20) to be pulled out from the sub-antenna (5).

9 Claims, 6 Drawing Sheets

(51) Int. Cl.
*G06F 1/16* (2006.01)
*G06F 1/18* (2006.01)

(58) Field of Classification Search
USPC .................................................. 455/474, 471
See application file for complete search history.

(56) References Cited

U.S. PATENT DOCUMENTS

| | | | |
|---|---|---|---|
| 2009/0021805 A1* | 1/2009 | Suto | H04N 1/00283 |
| | | | 358/498 |
| 2011/0188096 A1* | 8/2011 | Lin | H04N 1/00604 |
| | | | 358/498 |
| 2013/0225247 A1* | 8/2013 | Kim | H04M 1/0202 |
| | | | 455/575.1 |
| 2015/0263411 A1* | 9/2015 | Asai | H01Q 1/2216 |
| | | | 343/702 |
| 2018/0248987 A1* | 8/2018 | Cha | H04M 1/0249 |
| 2019/0173506 A1* | 6/2019 | Cha | H04B 1/3816 |

FOREIGN PATENT DOCUMENTS

| | | |
|---|---|---|
| JP | 2015-027009 A | 2/2015 |
| JP | 2015-041230 A | 3/2015 |
| JP | 2015-133588 A | 7/2015 |

\* cited by examiner

PORTABLE TERMINAL

TECHNICAL FIELD

The present invention relates to a portable terminal, in particular, to extracting identification information which is internally stored in the portable terminal.

BACKGROUND ART

As a rule, portable terminals such as mobile phones and data communication terminals each have an International Mobile Equipment Identifier (IMEI or terminal identification number).

In recent years, portable terminals including smartphones are configured to have a reduced size and a built-in battery. This has made it difficult to secure an area for displaying important information such as an IMEI and the production number. In view of the above, techniques as disclosed in, for example, Patent Literatures 1 to 3 have been conventionally employed. According to the techniques, identification information, which is important information such as an IMEI, is displayed on a drawer type IMEI display tray. Then, only when necessary, that display tray is pulled out and the identification information is checked.

CITATION LIST

Patent Literature

[Patent Literature 1] Japanese Patent Application Publication, Tokukai, No. 2015-027009 (Publication Date: Feb. 5, 2015)

[Patent Literature 2] Japanese Patent Application Publication, Tokukai, No. 2015-041230 (Publication Date: Mar. 2, 2015)

[Patent Literature 3] Japanese Patent Application Publication, Tokukai, No. 2015-133588 (Publication Date: Jul. 23, 2015)

SUMMARY OF INVENTION

Technical Problem

However, in such a conventional portable terminal, the drawer type IMEI display tray is made of a hard member. Accordingly, it is necessary to secure a region for storing such an IMEI display tray along one plane in the portable terminal, which region is a part of the portable terminal in a thickness direction of the portable terminal. On this account, there is a limitation to thickness reduction of portable terminals. This is a problem.

The present invention is attained in view of the above conventional problem. An object of the present invention is to provide a portable terminal which can achieve reduction in thickness of the portable terminal even in a case where the portable terminal includes a display tray that displays identification information.

Solution to Problem

In order to solve the above problem, a portable terminal in accordance with an aspect of the present invention is configured to include: a display tray displaying identification information, the display tray being made of a flexible band-shaped sheet member and incorporated in a housing, the identification information being viewable to a user when the display tray is pulled out from the housing; and a guide member for guiding the display tray along a direction in which the display tray is pulled out, the guide member guiding the display tray so as to allow the display tray to be pulled out from the housing.

Advantageous Effects of Invention

An aspect of the present invention advantageously makes it possible to provide a portable terminal which can achieve reduction in thickness of the portable terminal even in a case where the portable terminal includes a display tray that displays identification information.

BRIEF DESCRIPTION OF DRAWINGS (a) of FIG. 1 is a perspective view illustrating a configuration of a display tray which is incorporated in a housing of a portable terminal in accordance with Embodiment 1 of the present invention, in a state in which the display tray is stored in the housing. (b) of FIG. 1 is a perspective view illustrating a configuration of the display tray which is incorporated in the housing of the portable terminal, in a state in which the display tray is pulled out from the housing.

Figure 4:
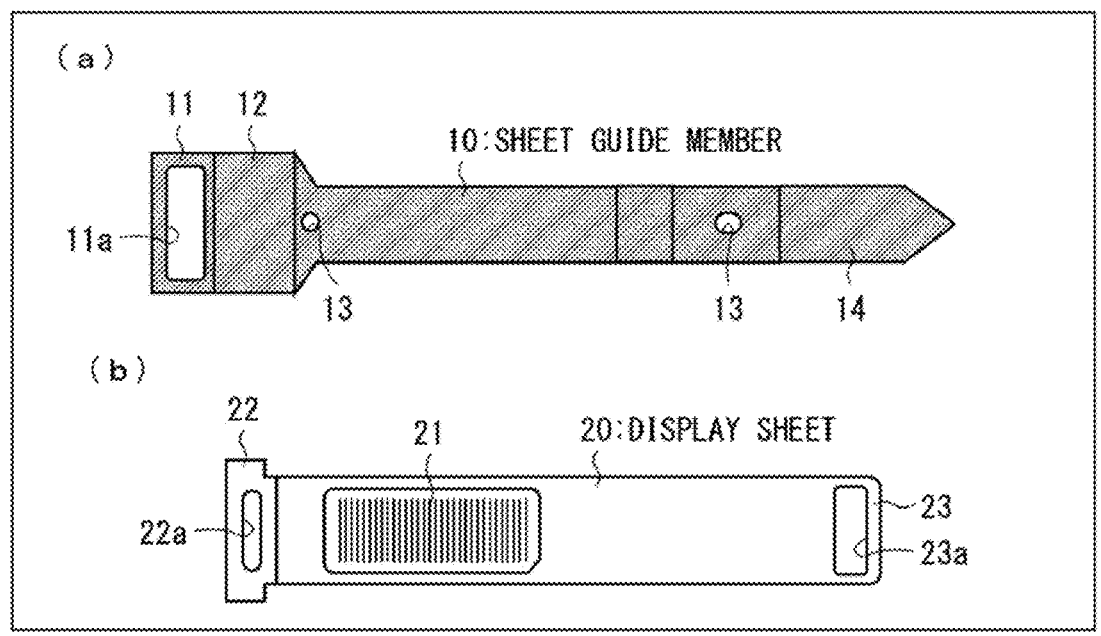

(a) of FIG. 4 is a plan view illustrating a configuration of a sheet guide member fixed to a sub-antenna of the portable terminal. (b) of FIG. 4 is a plan view illustrating a configuration of the display tray which is guided by the sheet guide member.

Figure 5:
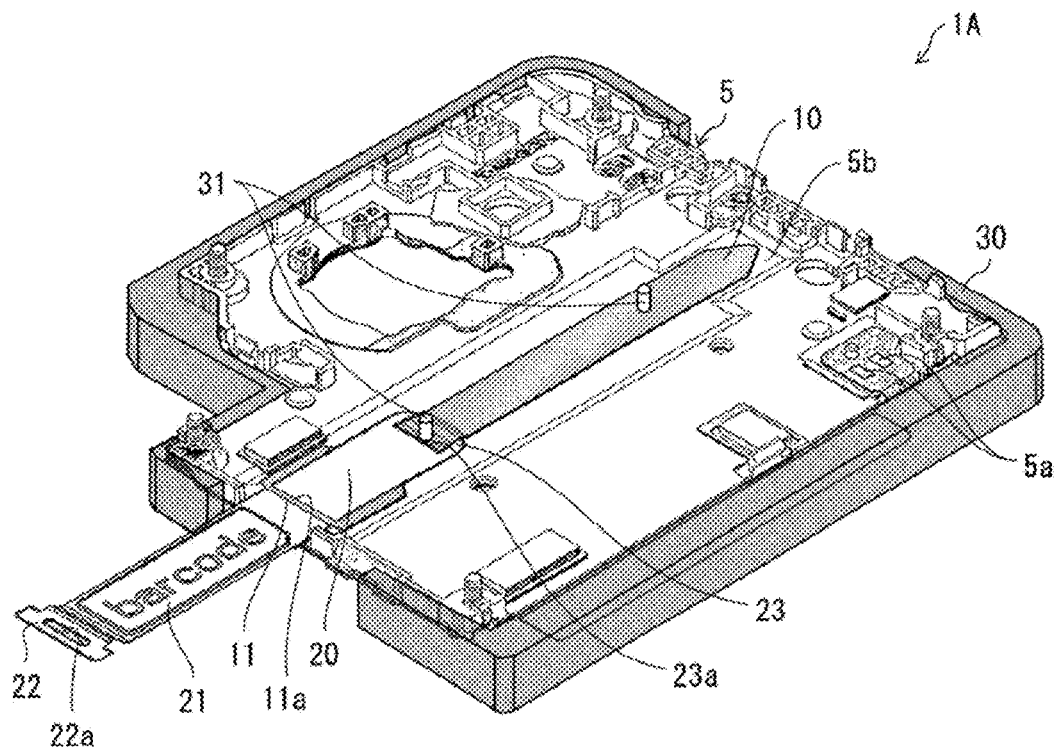

FIG. 5 is a perspective view illustrating how the display sheet is mounted to the sheet guide member and how the sheet guide member is positioned with respect to the sub-antenna.

Figure 6:
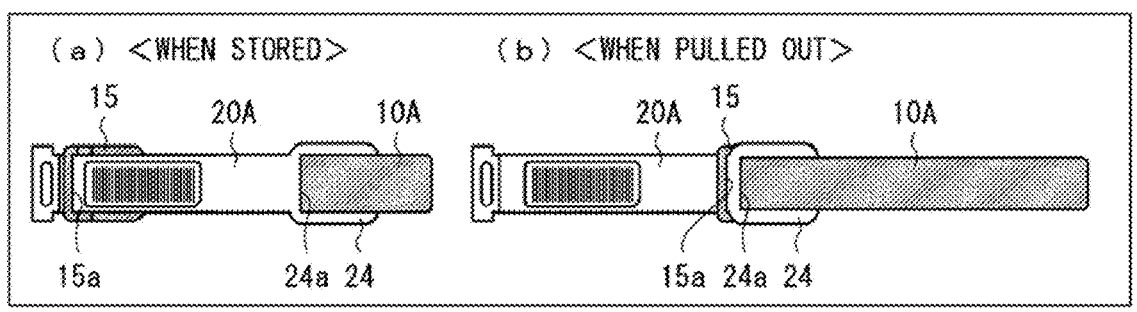

(a) of FIG. 6 is a plan view illustrating a configuration of a display tray and a guide member which are incorporated in a housing in a variation of the portable terminal in accordance with Embodiment 1 of the present invention, in a state in which the display tray is stored. (b) of FIG. 6 is a plan view illustrating a state in which the display tray incorporated in the housing of the portable terminal is pulled out from the housing.

Figure 7:
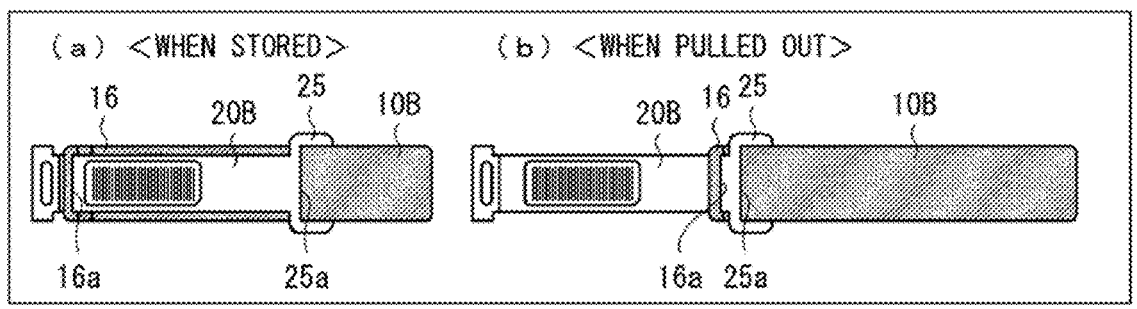

(a) of FIG. 7 is a plan view illustrating a configuration of a display tray and a guide member which are incorporated in a housing in another variation of the portable terminal in accordance with Embodiment 1 of the present invention, in a state in which the display tray is stored. (b) of FIG. 7 is a plan view illustrating a state in which the display tray incorporated in the housing of the portable terminal is pulled out from the housing.

Figure 8:
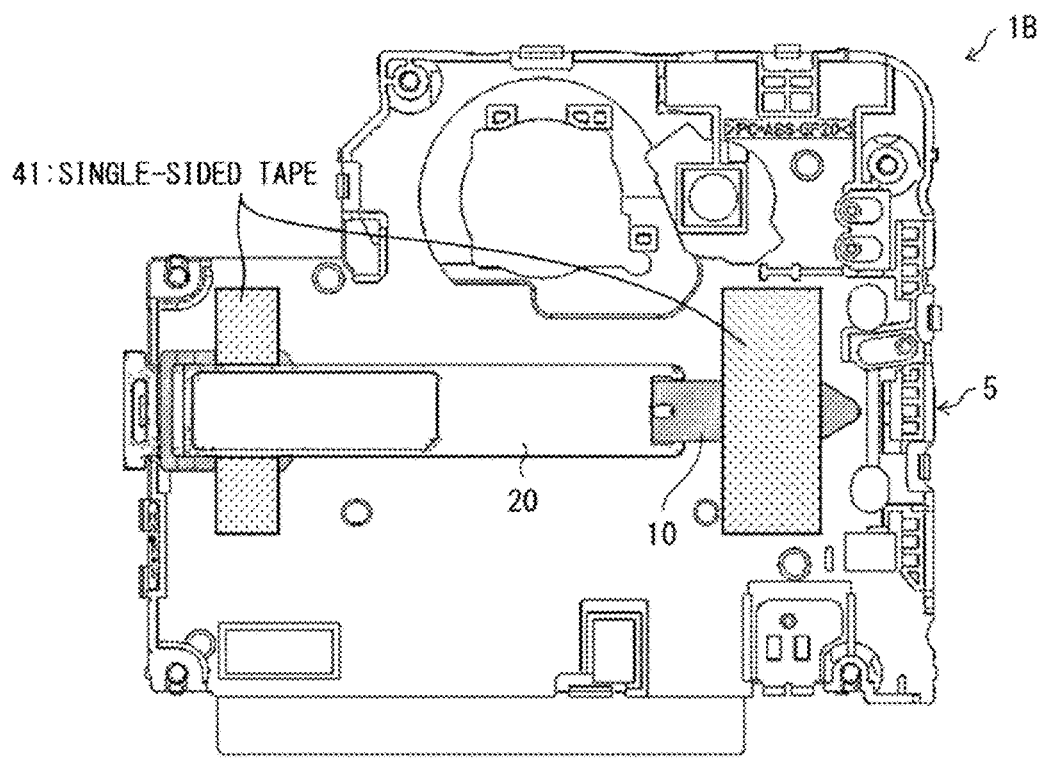

FIG. 8 is a plan view illustrating a configuration of a display tray and a guide member which are incorporated in a housing of a portable terminal in accordance with Embodiment 2 of the present invention, in a state in which the guide member is fixed to the housing with use of a single-sided tape.

Figure 9:
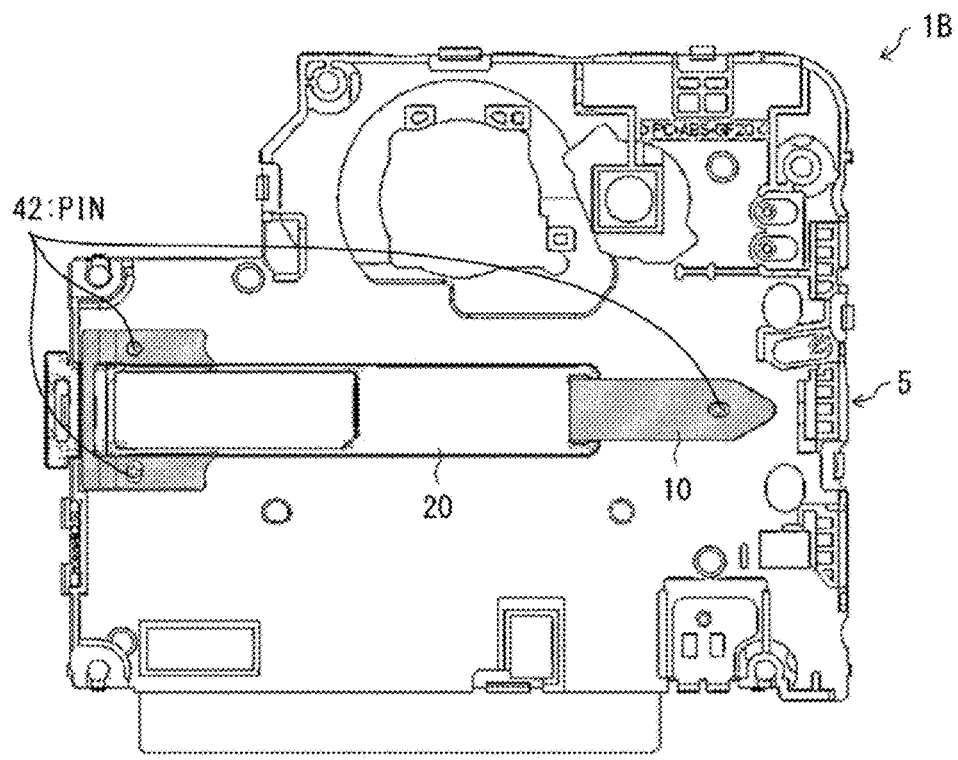

FIG. 9 is a plan view illustrating a configuration of a display tray and a guide member which are incorporated in a housing in a variation of the portable terminal in accordance with Embodiment 2, in a state in which the guide member is fixed to the housing with use of pins.

Figure 10:
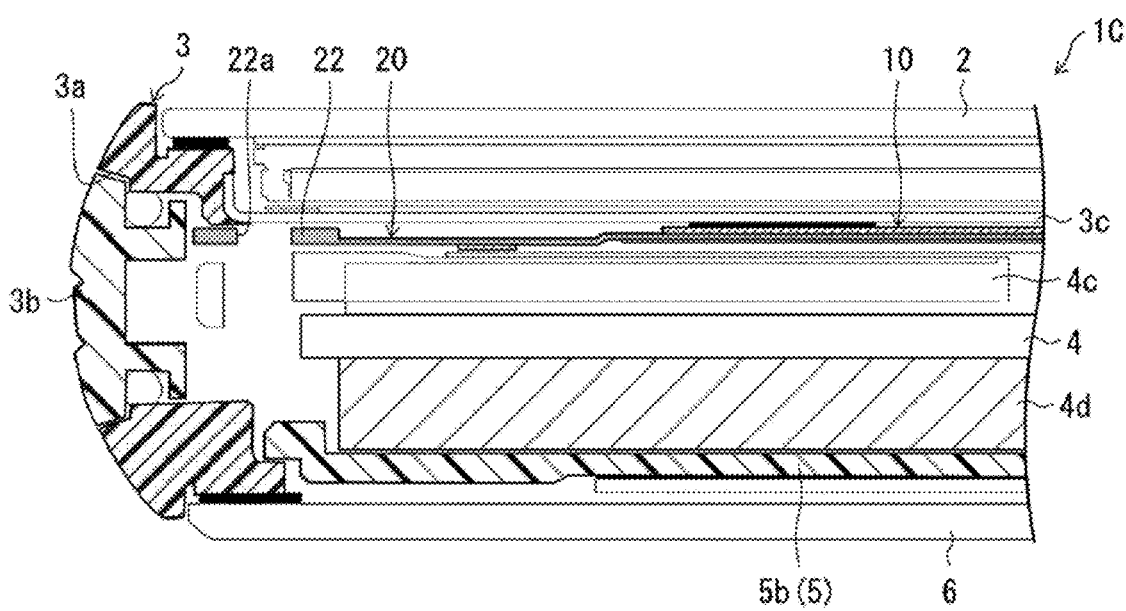

FIG. 10 is a cross-sectional view of a relevant part of a portable terminal in accordance with Embodiment 3 of the present invention, which cross-sectional view illustrates a configuration of a display tray and a guide member which are incorporated in a housing of the portable terminal and provided between a display panel and a circuit board.

DESCRIPTION OF EMBODIMENTS

Embodiment 1

The following will discuss Embodiment 1 of the present invention, with reference to FIGS. 1 to 7.

Embodiment 1 will describe a mobile phone 1A such as a smartphone, as an example of a portable terminal. Note that a portable terminal in accordance with an aspect of the present invention is not necessarily a mobile phone, and can be, for example, a data communication terminal.

Figure 2:
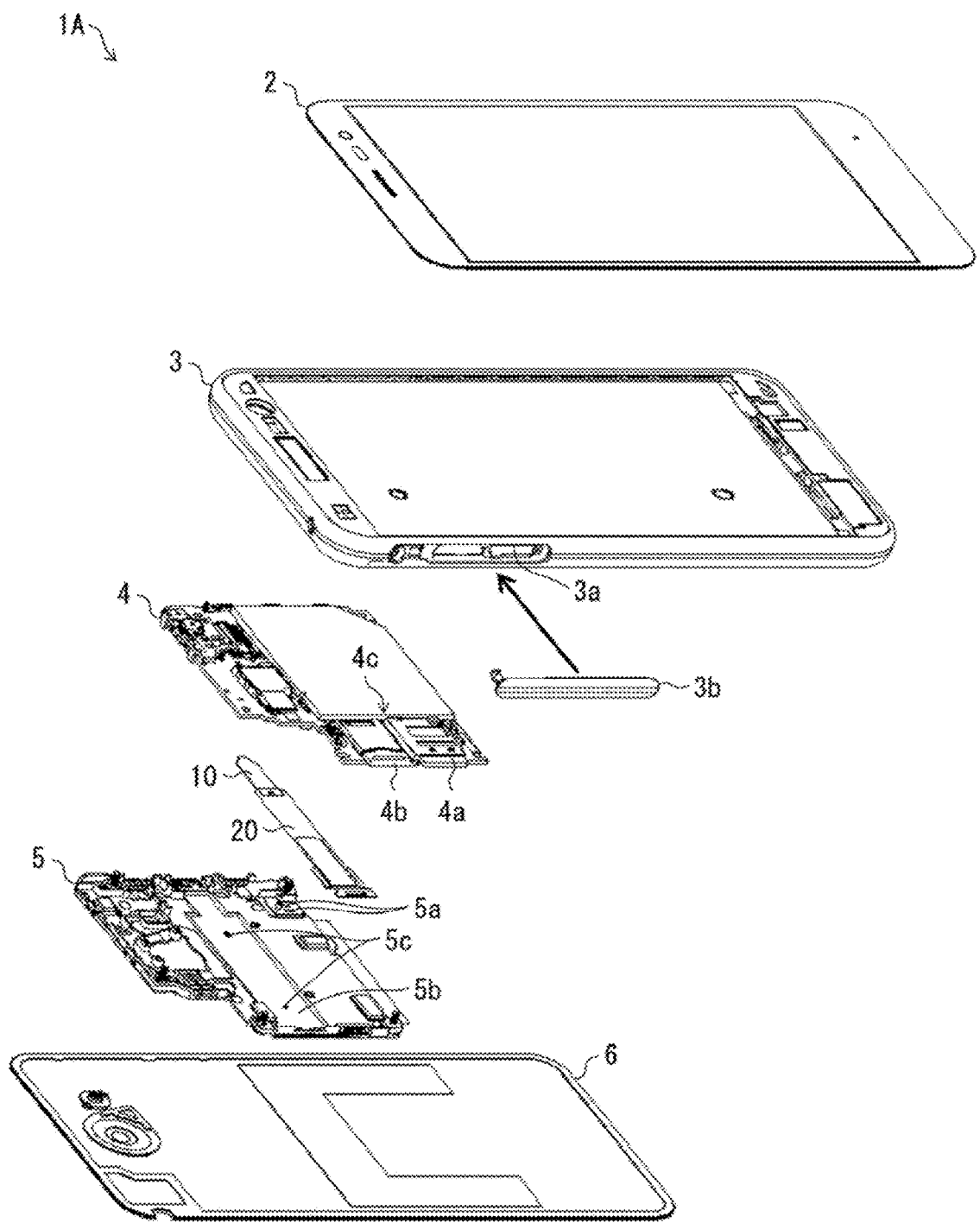
FIG. 2 is an exploded perspective view illustrating an overall configuration of the portable terminal.
Figure 3:
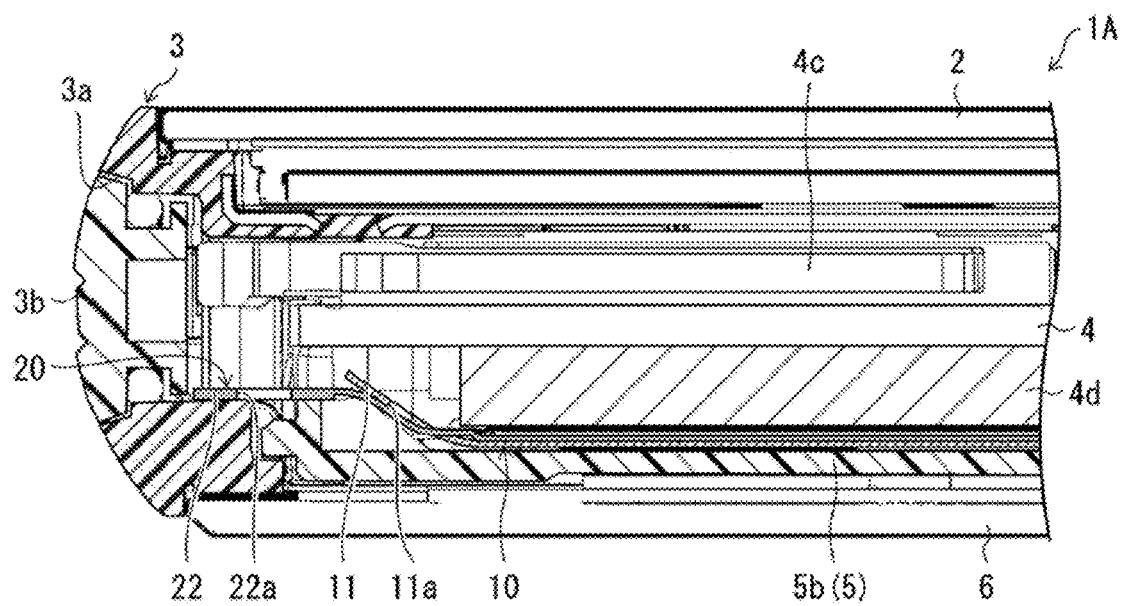
FIG. 3 is a cross-sectional view illustrating a relevant part of a configuration of the portable terminal which includes the display tray incorporated in the housing.

The following will describe an overall configuration of the mobile phone 1A as a portable terminal in accordance with Embodiment 1, with reference to FIGS. 2 and 3. FIG. 2 is an exploded perspective view illustrating the overall configuration of the portable terminal. FIG. 3 is a cross-sectional view illustrating a relevant part of a configuration of the portable terminal which includes a display tray incorporated in the housing.

As illustrated in FIGS. 2 and 3, the mobile phone 1A in accordance with Embodiment 1 includes: a front cabinet 3 which accommodates, for example, a liquid crystal display section 2 as a display panel including a touch panel; and a back cabinet 6 which covers a back side of the front cabinet 3. Further, the mobile phone 1A contains an electronic circuit board 4 as a circuit board, a shield 4d, and a sub-antenna 5 in this order from above, between the front cabinet 3 and the back cabinet 6. In Embodiment 1, the front cabinet 3, the back cabinet 6, and the sub-antenna 5 serve as a housing in accordance with an aspect of the present invention.

At a side surface of the electronic circuit board 4, a card connector 4c is provided. An SD card 4a and a SIM card 4b are each attachable to/detachable from the card connector 4c.

Further, at a side surface of the front cabinet 3, an opening 3a is provided. The opening 3a allows the SD card 4a and the SIM card 4b to be attached along one plane to the card connector 4c. The opening 3a is covered by a connector cover 3b. When the SD card 4a and the SIM card 4b are attached to or detached from the card connector 4c or when a display sheet 20 as a display tray (described later) is pulled out, the connector cover 3b can be opened.

Figure 1:
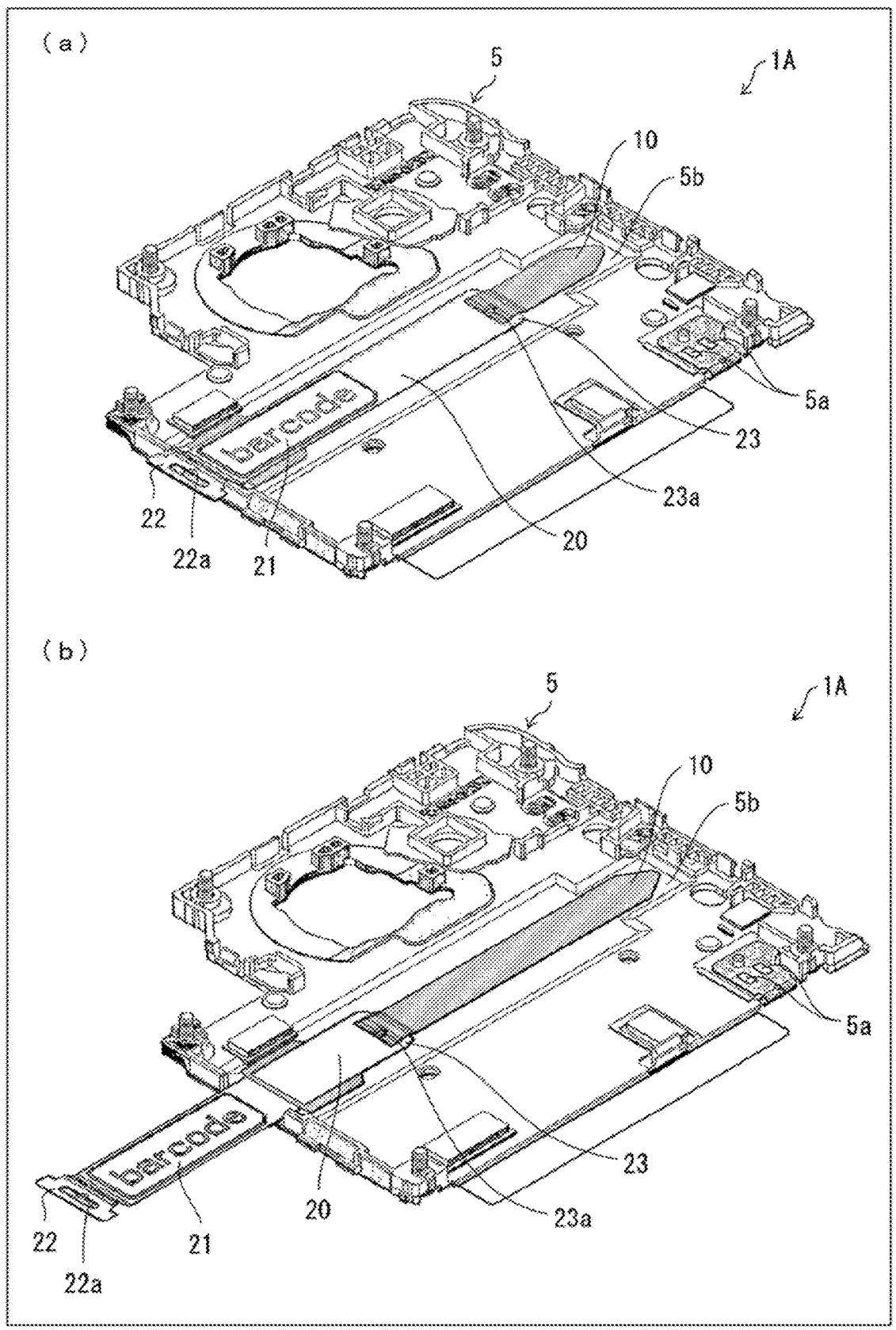

The sub-antenna 5 includes a Near Field Communication (NFC) antenna 5a etc. as illustrated in (a) and (b) of FIG. 1.

In general, a mobile station (terminal) such as a mobile phone or PHS is provided with two antenna systems including a main antenna and a sub-antenna. Note that the main antenna is not illustrated in Embodiment 1.

Portable terminals such as mobile phones and data communication terminals each have, as a rule, an International Mobile Equipment Identifier (IMEI or terminal identification number).

In recent years, portable terminals including smartphones are configured to have a reduced size and a built-in battery. This has made it difficult to secure an area for displaying important information such as an IMEI and the production number. In view of the above, conventionally employed is a technique according to which important information such as an IMEI is displayed on a drawer type display tray. Then, only when necessary, that display tray is pulled out and the important information is checked.

However, in such a conventional portable terminal, the drawer type display tray is made of a hard member. Accordingly, it is necessary to secure a region for storing the display tray along one plane in the portable terminal, which region is a part of the portable terminal in a thickness direction of the portable terminal. On this account, there is a limitation to reduction in thickness of portable terminals. This is a problem.

In light of the above, the mobile phone 1A in accordance with Embodiment 1 solves the problem as below. The following will describe a drawer type display tray in the mobile phone 1A in accordance with Embodiment 1, with reference to (a) and (b) of FIG. 4. (a) of FIG. 4 is a plan view illustrating a configuration of a sheet guide member fixed to the sub-antenna of the portable terminal. (b) of FIG. 4 is a plan view illustrating a configuration of the display tray which is guided by the sheet guide member.

The display sheet 20 as the display tray in accordance with Embodiment 1 is formed so as to be a flexible band-shaped sheet, as illustrated in (b) of FIG. 4. Further, on a surface of the display sheet 20, a bar code 21 indicative of identification information is displayed in a one-dimensional manner. Then, as illustrated in (a) and (b) of FIG. 1 which will be described later, the display sheet 20 is pulled out while being guided along the sheet guide member 10 in a band shape. This makes it possible to see the bar code 21 that is displayed on the surface of the display sheet 20. In Embodiment 1, a label on which the bar code 21 is printed is attached to the display sheet 20.

The bar code 21 indicates, for example, an International Mobile Equipment Identifier. Note that though the identification information is displayed as a one-dimensional bar code 21 in Embodiment 1, an embodiment of the present invention is not necessarily limited to this configuration. According to an aspect of the present invention, the identification information may be displayed as a two-dimensional bar code, that is, a so-called QR code (Registered Trademark). Alternatively, the identification information may be described not in code but in letters or the like. Further, the identification information may be, for example, some sort of device information associated with the mobile phone 1A other than the International Mobile Equipment Identifier.

The display sheet 20 in accordance with Embodiment 1 is made of a flexible material such as plastic. The display sheet 20, however, is not necessarily made of plastic. The display sheet 20 may be made of paper, rubber, cloth, metal, or the like that is flexible.

The display sheet 20 is provided with a tab 22 at a forward end portion on a side on which the display sheet 20 is pulled out. This forward end is a left end portion of the display sheet 20 in (b) of FIG. 4. Meanwhile, the display sheet 20 is provided with a rear end guide 23 at a rear end portion opposite to the side on which the display sheet 20 is pulled out. This rear end portion is a right end portion in (b) of FIG. 4.

The tab 22 has a widened portion which is larger in width than a center portion of the display sheet 20 in a lengthwise direction of the display sheet 20. The display sheet 20 is retracted along the sheet guide member 10 which is formed in a band shape as illustrated in (a) of FIG. 4, and stored inside the sub-antenna 5. In the above configuration, when the display sheet 20 is retracted and stored, the tab 22 including the widened portion of the display sheet 20 is stuck in a sheet guide portion hole 11a in a sheet guide portion 11 of the sheet guide member 10. Accordingly, the display sheet 20 does not move further in the sub-antenna 5.

Further, the tab 22 is provided with a tab hole 22a. This makes it possible to put a hooking tool (not illustrated) or a nail of a user to be put in the tab hole 22a and to pull the display sheet 20 leftward in (b) of FIG. 4. As a result, the display sheet 20 can be pulled out so as to draw the display sheet 20 outside on a lateral side of the front cabinet 3.

Meanwhile, the rear end guide 23 of the display sheet 20 in accordance with Embodiment 1 has a rear end guide hole 23a which is formed as a loose-fitting part. The rear end guide hole 23a is formed as illustrated in (a) of FIG. 4 so as to allow the sheet guide member 10 formed in a band shape to be put through the rear end guide hole 23a in a state in which the sheet guide member 10 is loosely fitted in the rear end guide hole 23a. Note that "to allow the sheet guide member 10 formed in a band shape to be put through the rear end guide hole 23a in a state in which the sheet guide member 10 is loosely fitted in the rear end guide hole 23a" means a state in which the sheet guide member 10 is loosely fitted with play in the rear end guide hole 23a such that the sheet guide member 10 can freely move in the rear end guide hole 23a.

Therefore, the rear end guide hole 23a is larger in width than the sheet guide member 10 whose width is orthogonal to a lengthwise direction of the sheet guide member 10. At the same time, an inside dimension of the rear end guide hole 23a in the lengthwise direction of the display sheet 20 is larger than a thickness of the sheet guide member 10.

In Embodiment 1, the sheet guide member 10 for guiding the display sheet 20 in a direction in which the display sheet 20 is pulled out is made of a flexible material such as plastic that is formed in a band shape as illustrated in (a) of FIG. 4. The sheet guide member 10, however, is not necessarily made of plastic. The sheet guide member 10 may be made of paper, rubber, cloth, metal, or the like that is flexible.

The sheet guide member 10 is longer than the display sheet 20 in the direction in which the display sheet 20 is pulled out. This configuration prevents the rear end guide hole 23a of the display sheet 20 from being detached from a rear end portion of the sheet guide member 10, when the display sheet 20 is retracted for storage in a direction of a region for storage.

Further, the sheet guide member 10 has a widened portion 12 at a left end portion of the sheet guide member 10 in (a) of FIG. 4. When the display sheet 20 is pulled out, the rear end guide hole 23a in the rear end guide 23 of the display sheet 20 is stuck on this widened portion 12. Accordingly, the widened portion 12 prevents the display sheet 20 from being pulled out further. This makes it possible to prevent the display sheet 20 from being detached from the front cabinet 3 when the display sheet 20 is pulled out. Therefore, the widened portion 12 of the sheet guide member 10 has a function of a retaining shape in an aspect of the present invention, in which aspect the display sheet 20 is prevented from slipping off the sheet guide portion hole 11a of the sheet guide member 10 and being detached from the sheet guide member 10 when the display sheet 20 is pulled out.

As described above, the display sheet 20 and the sheet guide member 10 are configured to allow the display sheet 20 to be pulled out along the sheet guide member 10 and to be stored inside the front cabinet 3 along the sheet guide member 10, in the mobile phone 1A in accordance with Embodiment 1.

More specifically, the display sheet 20 and the sheet guide member 10 in accordance with Embodiment 1 are configured to be stored in a depression 5b which is formed in the sub-antenna 5, as illustrated in (a) and (b) of FIG. 1.

The following will discuss how the display sheet 20 is mounted to the sheet guide member 10 and how the sheet guide member 10 is positioned and fixed with respect to the sub-antenna 5 in accordance with Embodiment 1, with reference to FIG. 5. FIG. 5 is a perspective view illustrating how the display sheet 20 is mounted to the sheet guide member 10 and how the sheet guide member 10 is positioned with respect to the sub-antenna 5.

In Embodiment 1, as illustrated in FIG. 5, the sheet guide member 10 is fixed to the sub-antenna 5 in a state in which the display sheet 20 is pulled out.

In order to mount the display sheet 20 to the sheet guide member 10, first, the rear end guide 23 of the display sheet 20 is caused to pass through the sheet guide portion hole 11a in the sheet guide portion 11 of the sheet guide member 10, as illustrated in (a) and (b) of FIG. 4. Subsequently, the display sheet 20 is caused to move rightward in (b) of FIG. 4. The display sheet 20 here is arranged to have a length which is set shorter than that of the sheet guide member 10. Accordingly, in a state in which the widened portion of the tab 22 of the display sheet 20 is stuck in the sheet guide portion hole 11a of the sheet guide member 10, the rear end guide hole 23a of the display sheet 20 does not reach a right end of the sheet guide member 10 illustrated in (a) of FIG. 4. In Embodiment 1, since the sheet guide member 10 is also flexible, the sheet guide member 10 in the above state is bent and a right end portion of the sheet guide member 10 is caused to pass through the rear end guide hole 23a of the display sheet 20. Subsequently, the sheet guide member 10 is release from that bend. This allows the display sheet 20 to be mounted to the sheet guide member 10 in such a manner that the display sheet 20 is free to advance/retract along the lengthwise direction of the sheet guide member 10.

From the above state, the display sheet 20 is once pulled out leftward. Then, the rear end guide hole 23a of the display sheet 20 subsequently abuts on the widened portion 12 of the sheet guide member 10. The position of the display sheet 20 at this time is a position in a case where the display sheet 20 is maximally pulled out. In such a state, positioning of the sheet guide member 10 is carried out for fixing the sheet guide member 10 to the sub-antenna 5.

In positioning of the sheet guide member 10 in the depression 5b of the sub-antenna 5, a positioning jig 30 is used as illustrated in FIG. 5. The positioning jig 30 is provided with two positioning pins 31 which are arranged to stand upright at positions which are set in advance. Meanwhile, as illustrated in FIG. 2, the depression 5b of the sub-antenna 5 is provided with holes 5c into which the positioning pins 31 are to be inserted. The holes 5c are provided at the same interval as those set positions of the positioning pins 31. In addition, as illustrated in (a) of FIG. 4, the sheet guide member 10 is provided with holes 13 into which the positioning pins 31 are to be inserted. The holes 13 are also provided at the same interval as the set positions of the positioning pins 31.

Therefore, as illustrated in FIG. 5, the sub-antenna 5 is placed on an upper side of the positioning jig 30. Then, the positioning pins 31 are caused to pass through the holes 5c of the sub-antenna 5. Further, the positioning pins 31 are caused to pass through the holes 13 of the sheet guide member 10. This makes it possible to position the sheet guide member 10 at a desired position in the depression 5b of the sub-antenna 5.

In Embodiment 1, at the above desired position of the sheet guide member 10, the sheet guide member 10 is fixed to the depression 5b of the sub-antenna 5. When the sheet guide member 10 is fixed, a double-sided tape (not illustrated) is attached to (i) a back surface of the widened portion 12 of the sheet guide member 10 illustrated in (a) of FIG. 4 and (ii) a tape attachment portion 14 at a right end portion of the sheet guide member 10 illustrated in (a) of FIG. 4.

As a result, it is possible to pull out or store the display sheet 20 by advancing/retracting the display sheet 20 along the lengthwise direction of the sheet guide member 10.

In the above description, the sub-antenna 5 is provided with the holes 5c into which the positioning pins 31 are to be inserted. Further, the sheet guide member 10 is provided with the holes 13 into which the positioning pins 31 are to be inserted. Then, after the sheet guide member 10 is positioned by use of the positioning jig 30 having the positioning pins 31, the sheet guide member 10 is fixed with the double-sided tape to the sub-antenna 5. This is because, in Embodiment 1, the positioning pins 31 cannot be provided on the sub-antenna 5 due to the presence of the shield 4d right above the sub-antenna 5 as illustrated in FIG. 3. Therefore, in a case where there is a space for providing positioning pins right above the sub-antenna 5, it is possible to provide the sub-antenna 5 with pins 42 which stand upright, as in Embodiment 2 which will be described later.

The following will discuss a state in which the display sheet 20 configured as above is stored in the sub-antenna 5 and a state in which the display sheet 20 is pulled out from the sub-antenna 5, with reference to (a) and (b) of FIG. 1, and FIGS. 2 and 3. (a) of FIG. 1 is a perspective view illustrating a configuration of a display tray which is incorporated in a housing of a portable terminal in accordance with Embodiment 1 of the present invention, in a state in which the display tray is stored in the housing. (b) of FIG. 1 is a perspective view illustrating a configuration of the display tray which is incorporated in the housing of the portable terminal, in a state in which the display tray is pulled out from the housing.

As illustrated in (a) of FIG. 1, when the display sheet 20 is stored in the sub-antenna 5, the display sheet 20 is placed on an upper surface of the sheet guide member 10 so as to be overlap the sheet guide member 10. In this state, the tab 22 of the display sheet 20 is located at the opening 3a of the front cabinet 3, as illustrated in FIG. 3. Further, the sheet guide member 10 is stored in the depression 5b of the sub-antenna 5, and the position of the display sheet 20 is lower than the position of the opening 3a. As a result, after the display sheet 20 is caused to pass through the sheet guide portion hole 11a in the sheet guide portion 11 of the sheet guide member 10, the display sheet 20 is inclined upward. Further, the display sheet 20 is caused to extend laterally such that the tab 22 is located at the opening 3a. In other words, since the display sheet 20 in accordance with Embodiment 1 is flexible, the position where the bar code 21 on the display sheet 20 is stored can be arranged to be lower than the position of the tab 22 of the display sheet 20. That is, since the display sheet 20 is used as the display tray and the display sheet 20 is made of a thin sheet member which can curve, it is possible to have a configuration in which a position where the display tray is pulled out and a position where the display tray is stored may be different from each other in a thickness direction of the mobile phone 1A.

Then, in order to pull out the display sheet 20 from the position where the display sheet 20 is stored, a user puts his/her nail or the like in the tab hole 22a in the tab 22 of the display sheet 20 after opening the connector cover 3b of the front cabinet 3. Then, the user pulls out the display sheet 20. In this configuration, as illustrated in (b) of FIG. 1, the display sheet 20 is pulled out such that the bar code 21 is exposed. As a result, the user can see display of the bar code 21.

In order to store the display sheet 20 from the above state, the user pushes the tab 22 of the display sheet 20 so as to retract the display sheet 20. In this case, the display sheet 20 is guided along the sheet guide member 10 by use of the rear end guide 23 of the display sheet 20. Accordingly, the display sheet 20 is automatically guided to a position where the display sheet 20 overlaps the sheet guide member 10. Subsequently, after the display sheet 20 is retracted until the tab 22 is located at the opening 3a, the opening 3a is capped with the connector cover 3b. As a result, the display sheet 20 is in a storage state.

As described above, the mobile phone 1A as a portable terminal in accordance with Embodiment 1 includes the display sheet 20 as a display tray which is incorporated in the front cabinet 3 and the sub-antenna 5 as a housing, which display sheet 20 displays a bar code 21 as identification information. Then, the mobile phone 1A allows a user to see the bar code 21 when the display sheet 20 is pulled out from the front cabinet 3 and the sub-antenna 5. The display sheet 20 here is made of a flexible band-shaped sheet member. Further, the mobile phone 1A includes the sheet guide member 10 as a guide member, which guides the display sheet 20 along a direction in which the display sheet 20 is pulled out so that the display sheet 20 can be pulled out from the front cabinet 3 and the sub-antenna 5.

In the above configuration, the sheet guide member 10 is provided. This sheet guide member 10 guides the display sheet 20 along the direction in which the display sheet 20 is pulled out, so that the display sheet 20 can be pulled out from the front cabinet 3 and the sub-antenna 5. Accordingly, when the display sheet 20 is pulled out, the sheet guide member 10 guides the display sheet 20 along the direction in which the display sheet 20 is pulled out so that the display sheet 20 is pulled out from the front cabinet 3 and the sub-antenna 5. The display sheet 20 here is made of a flexible band-shaped sheet member. This makes it possible to pull out the display sheet 20 even in a case where the display sheet 20 is not along one plane, and at the same time, allow the display sheet 20 to be made of a thin member.

Therefore, it is possible to provide the mobile phone 1A which can achieve reduction in thickness of the mobile phone 1A even in a case where the mobile phone 1A includes a display tray that displays the bar code 21.

Further, the mobile phone 1A in accordance with Embodiment 1 is configured such that: the sheet guide member 10 is made of a flexible band-shaped sheet member; and the sheet guide member 10 is provided with a sheet guide portion hole 11a as a guide member hole (hole in the guide member) through which the display sheet 20 moves along a lengthwise direction of the display sheet 20. The sheet guide portion hole 11a is provided at a forward end portion of the sheet guide member 10 in the direction in which the display sheet 20 is pulled out.

In the above configuration, the display sheet 20 and the sheet guide member 10 are each made of a flexible band-shaped sheet member. This makes it possible to make both the display sheet 20 and the sheet guide member 10 thin.

Further, the sheet guide member 10 is provided with the sheet guide portion hole 11a through which the display sheet 20 moves along the lengthwise direction of the display sheet 20. The sheet guide portion hole 11a is provided at the forward end portion of the sheet guide member 10 in the direction in which the display sheet 20 is pulled out. Accordingly, when the display sheet 20 made of a band-shaped sheet member is pulled out, the display sheet 20 is reliably guided, via the sheet guide portion hole 11a of the sheet guide member 10, along the direction in which the display sheet 20 is pulled out. This direction in which the display sheet 20 is pulled out corresponds to the lengthwise direction of the sheet guide member 10.

Further, the mobile phone 1A in accordance with Embodiment 1 is configured such that: the display sheet 20 is provided with the rear end guide hole 23a as a display tray hole (hole in the display tray) such that the display tray 20 moves along the lengthwise direction of the display tray 20 in a state in which the guide member 10 is put through the rear end guide hole 23a, the rear end guide hole 23a being provided at a rear end portion of the display sheet 20 in the direction in which the display sheet 20 is pulled out.

In the above configuration, the rear end guide hole 23a is provided at the rear end portion of the display sheet 20 in the direction in which the display sheet 20 is pulled out. Then, when the display sheet 20 is retracted, the rear end guide hole 23a moves along the sheet guide member 10. As a result, when the display sheet 20 is retracted, the display sheet 20 moves to a rear side along the sheet guide member 10. This makes it possible to store the display sheet 20 inside the front cabinet 3 and the sub-antenna 5 in a state in which the display sheet 20 is not slanted.

Further, in the mobile phone 1A in accordance with Embodiment 1, the sheet guide member 10 is fixed to the sub-antenna 5.

Since an area of the sub-antenna 5 is large, the above configuration makes it possible to easily store the display sheet 20 and the sheet guide member 10 even in a case where the display sheet 20 and the sheet guide member 10 are large.

Further, in the mobile phone 1A in accordance with Embodiment 1, the sheet guide member 10 is fixed to the sub-antenna 5 at least at the rear end portion of the sheet guide member 10 in the direction in which the display sheet 20 is pulled out.

In the above configuration, the sheet guide member 10 is fixed to the sub-antenna 5 at the rear end portion of the sheet guide member 10. This makes it possible to store the display sheet 20 inside the sub-antenna 5 in a state in which the display sheet 20 is not slanted.

Further, in a case where the sheet guide member 10 is fixed to the sub-antenna 5 at both of the rear end portion and the forward end portion of the sheet guide member 10 in the direction in which the display sheet 20 is pulled out, the display sheet 20 can not only be stored inside the sub-antenna 5 in a state in which the display sheet 20 is not slanted but also be pulled out from the sub-antenna 5 in a state in which the display sheet 20 is not slanted.

Note that the present invention is not limited to the above embodiment, but can be altered within the scope of claims of the present invention. For example, in Embodiment 1, the width of the display sheet 20, which width is orthogonal to the lengthwise direction of the display sheet 20, is larger than the width of the sheet guide member 10 all along the display sheet 20 in the lengthwise direction.

However, an embodiment of the present invention is not particularly limited to such a configuration. For example, as illustrated in (a) and (b) of FIG. 6, a display sheet 20A can be arranged to have the same width as a sheet guide member 10A. Note however that, in this case, a sheet guide portion hole 15a in a sheet guide portion 15 of the sheet guide member 10A is configured to have a width that is larger than the width of the display sheet 20A. Meanwhile, a rear end guide hole 24a in a rear end guide 24 of the display sheet 20A is configured to have an inside dimension width that is larger than the width of the sheet guide member 10A.

This allows the display sheet 20A to be pulled out along the sheet guide member 10A even when the width of the display sheet 20A is the same as the width of the sheet guide member 10A. Further, in this case, the rear end guide 24 of the display sheet 20A abuts on the sheet guide portion 15 of the sheet guide member 10A and cannot pass through the sheet guide portion hole 15a when the display sheet 20A is pulled out, as illustrated in (a) of FIG. 6. This makes it impossible to further pull out the display sheet 20A. Therefore, the display sheet 20A cannot be completely pulled out or taken out of the sheet guide member 10A.

Further, for example, as illustrated in (a) and (b) of FIG. 7, a display sheet 20B can be arranged to have a smaller width than a sheet guide member 10B. In this case, as illustrated in (a) and (b) of FIG. 7, a sheet guide portion hole 16a in a sheet guide portion 16 of the sheet guide member 10B is configured to have a width that is larger than the width of the display sheet 20B. Meanwhile, a rear end guide hole 25a in a rear end guide 25 of the display sheet 20B is configured to have an inside dimension width that is larger than the width of the sheet guide member 10B.

This allows the display sheet 20B to be pulled out along the sheet guide member 10B even when the width of the display sheet 20B is smaller than the width of the sheet guide member 10B.

Further, also in this case, the rear end guide 25 of the display sheet 20B cannot pass through the sheet guide portion hole 16a of the sheet guide member 10B when the display sheet 20B is pulled out, as illustrated in (b) of FIG. 7. This makes it impossible to further pull out the display sheet 20B. Therefore, the display sheet 20B cannot be completely pulled out or taken out of the sheet guide member 10B.

As described above, the mobile phone 1A in accordance with Embodiment 1 is configured such that a retaining shape is formed in at least the display sheet 20, 20A, or 20B or the sheet guide member 10, 10A, or 10B, the retaining shape preventing the display sheet 20, 20A, or 20B from slipping off the sheet guide portion hole 11a, 15a, or 16a of the sheet guide member 10, 10A, or 10B and from being detached from the sheet guide member 10, 10A, or 10B, when the display sheet 20, 20A, or 20B is pulled out.

This makes it possible to prevent the display sheet 20, 20A, or 20B from slipping off the sheet guide portion hole 11a, 15a or 16a of the sheet guide member 10, 10A, or 10B and being detached from the sheet guide member 10, 10A, or 10B, when the display sheet 20, 20A, or 20B is pulled out.

As an example of the retaining shape, there is a shape having a widened portion 12 in the sheet guide member 10. The widened portion 12 is formed by arranging the sheet guide portion 11 such that the sheet guide portion 11 has a width that is larger than an inside dimension width of the rear end guide hole 23a of the display sheet 20, which sheet guide portion 11 is present at the forward end portion of the sheet guide member 10 in the direction in which the display sheet 20 is pulled out.

As another example of the retaining shape, there is a shape which is obtained by forming a rear end portion of the display sheet 20A or 20B in a direction in which the display sheet 20A or 20B is pulled out in such a manner that the rear end portion has a width that is larger than an inside dimension width of the sheet guide portion hole 15a or 16a.

Embodiment 2

Next, the following will discuss another embodiment of the present invention, with reference to FIG. 8. Note that configurations of Embodiment 2 other than configurations discussed below are the same as those in the above Embodiment 1. Further, for convenience of explanation, identical reference numerals are given to members which have respective functions identical with those illustrated in FIGS. 1 to 7 of the above Embodiment 1, and descriptions of the respective members are omitted.

In the mobile phone 1A of the above Embodiment 1, a double-sided tape is used for fixing the sheet guide member 10. In contrast, in a mobile phone 1B in accordance with Embodiment 2, a single-sided tape is used for fixing a sheet guide member 10 in place of the double-sided tape. The mobile phone 1B is different in this point from the mobile phone 1A.

The following will discuss a configuration of the mobile phone 1B as a portable terminal in accordance with Embodiment 2, with reference to FIGS. 8 and 9. FIG. 8 illustrates a configuration of the mobile phone 1B in accordance with Embodiment 2. FIG. 8 is a plan view illustrating a configuration of a display sheet 20 and a sheet guide member 10 which is fixed with a single-sided tape 41 to a sub-antenna 5. FIG. 9 illustrates another configuration of the mobile phone 1B in accordance with Embodiment 2. FIG. 9 is a plan view illustrating a configuration of a display sheet 20 and a sheet guide member 10 which is fixed with pins 42 to a sub-antenna 5.

In the mobile phone 1B in accordance with Embodiment 2, the sheet guide member 10 is incorporated in the sub-antenna 5 and the sheet guide member 10 is fixed with the single-sided tape 41 to the sub-antenna 5, as illustrated in FIG. 8.

The above configuration can be obtained only by (i) positioning the sheet guide member 10 incorporating the display sheet 20 and (ii) taping, with the single-sided tape 41, both ends of the sheet guide member 10 at a location thus positioned. Therefore, the above configuration makes it possible to easily fix the sheet guide member 10 to the sub-antenna 5.

Note that the present invention is not limited to the above embodiments, but can be altered within the scope of claims of the present invention.

In other words, in Embodiment 2, a double-sided tape or a single-sided tape is used as a fixing member for fixing the sheet guide member 10 to the sub-antenna 5. The present invention is not necessarily limited to such an embodiment. For example, it is also possible to use a fixing member such as an adhesive.

Further, for positioning of the display sheet 20 and the sheet guide member 10 in the sub-antenna 5, pins 42 can be provided so as to stand upright in the sub-antenna 5 in a case where no part is provided directly below those pins 42 and there is a space whose height (for example, approximately 1 mm) is sufficient for providing the pins 42.

This makes it unnecessary to carry out positioning of the sheet guide member 10 incorporating the display sheet 20 by use of the positioning jig 30 as described in Embodiment 1. Therefore, the above configuration can lead to reduction in process time.

Embodiment 3

The following will discuss another embodiment of the present invention, with reference to FIG. 10. Note that configurations of Embodiment 3 other than configurations discussed below are the same as those in the above Embodiments 1 and 2. Further, for convenience of explanation, identical reference numerals are given to members which have respective functions identical with those illustrated in FIGS. 1 to 9 of the above Embodiments 1 and 2, and descriptions of the respective members are omitted.

In each of the mobile phone 1A of the above Embodiment 1 and the mobile phone 1B of the above Embodiment 2, the sheet guide member 10 is fixed to the sub-antenna 5. In contrast, in a mobile phone 1C of Embodiment 3, a sheet guide member 10 is not fixed to a sub-antenna 5. The mobile phone 1C is different in this point from the mobile phones 1A and 1B.

The following will discuss a configuration of the mobile phone 1C as a portable terminal in accordance with Embodiment 3, with reference to FIG. 10. FIG. 10 is a cross-sectional view illustrating a relevant part of the configuration of the mobile phone 1C in accordance with Embodiment 3.

The mobile phone 1C in accordance with Embodiment 3 can be arranged such that a display sheet 20 and the sheet guide member 10 are not fixed to the sub-antenna 5 but provided between a front cabinet plate 3c and an electronic circuit board 4, as illustrated in FIG. 10. In other words, the display sheet 20 and the sheet guide member 10 are provided between a liquid crystal display section 2 as a display panel and the electronic circuit board 4 as a circuit board.

In this case, the display sheet 20 and the sheet guide member 10 are provided so as to be fixed on an upper side of a card connector 4c, as illustrated in FIG. 10.

As a result, the display sheet 20 and the sheet guide member 10 are provided so as to extend along one plane. Further, in this case, a tab 22 of the display sheet 20 faces an opening 3a of a front cabinet 3.

Therefore, the display sheet 20 can be easily pulled out from the front cabinet 3 when the display sheet 20 is pulled out along the one plane.

Further, the display sheet 20 and the sheet guide member 10 can be provided at a position outside the sub-antenna 5.

As described above, the mobile phone 1C as a portable terminal in accordance with Embodiment 3 is configured such that the display sheet 20 and the sheet guide member 10 are provided between the liquid crystal display section 2 as a display panel and the electronic circuit board 4 as a circuit board.

In Embodiment 3, since both of the display sheet 20 and the sheet guide member 10 are thin and flexible, the above configuration makes it possible to provide the display sheet 20 and the sheet guide member 10 between the liquid crystal display section 2 and the electronic circuit board 4 as needed, and the display sheet 20 and the sheet guide member 10 need not necessarily be provided in the sub-antenna 5.

[Recap]

A portable terminal (mobile phone 1A, 1B, 1C) in accordance with Aspect 1 of the present invention is configured to include: a display tray (display sheet 20) displaying identification information (bar code 21), the display tray (display sheet 20) being made of a flexible band-shaped sheet member and incorporated in a housing (front cabinet 3, back cabinet 6, sub-antenna 5), the identification information (bar code 21) being viewable to a user when the display tray (display sheet 20) is pulled out from the housing (front cabinet 3, back cabinet 6, sub-antenna 5); and a guide member (sheet guide member 10) for guiding the display tray (display sheet 20) along a direction in which the display tray (display sheet 20) is pulled out, the guide member (sheet guide member 10) guiding the display tray (display sheet 20) so as to allow the display tray (display sheet 20) to be pulled out from the housing (front cabinet 3, back cabinet 6, sub-antenna 5).

According to Aspect 1 of the present invention, the portable terminal includes the guide member which guides the display tray along a direction in which the display tray is pulled out so that the display tray can be pulled out from the housing. Accordingly, when the display tray is pulled out, the display tray is guided, by the guide member, along the direction in which the display tray is pulled out so that the display tray is pulled out from the housing. The display tray here is made of a flexible band-shaped sheet member. This makes it possible to pull out the display tray even in a case where the display tray is not along one plane, and at the same time, allow the display tray to be made of a thin member.

Therefore, it is possible to provide a portable terminal which can achieve reduction in thickness of the portable terminal even in a case where the portable terminal includes a display tray that displays identification information.

A portable terminal (mobile phone 1A, 1B, 1C) in accordance with Aspect 2 of the present invention is configured preferably such that, in the portable terminal described in Aspect 1: the guide member (sheet guide member 10, 10A, 10B) is made of a flexible band-shaped sheet member; and the guide member (sheet guide member 10, 10A, 10B) is provided with a hole (sheet guide portion hole 11a, 15a, 16a) through which the display tray (display sheet 20, 20A, 20B) moves along a lengthwise direction of the display tray (display sheet 20, 20A, 20B), the hole (sheet guide portion hole 11a, 15a, 16a) in the guide member (sheet guide member 10, 10A, 10B) being provided at a forward end portion of the guide member (sheet guide member 10, 10A, 10B) in the direction in which the display tray (display sheet 20, 20A, 20B) is pulled out.

In the above configuration, the display tray and the guide member are each made of a flexible band-shaped sheet member. This makes it possible to make both the display tray and the guide member thin.

Further, the guide member is provided with the hole through which the display tray moves along the lengthwise direction of the display tray. The hole in the guide member is provided at the forward end portion of the guide member in the direction in which the display tray is pulled out. Accordingly, when the display tray made of a band-shaped sheet member is pulled out, the display tray is reliably guided, via the hole in the sheet guide member, along the direction in which the display tray is pulled out. The direction in which the display tray is pulled out corresponds to the lengthwise direction of the guide member.

A portable terminal (mobile phone 1A, 1B, 1C) in accordance with Aspect 3 of the present invention is configured preferably such that, in the portable terminal described in Aspect 2, a retaining shape (widened portion 12) is formed in at least the display tray (display sheet 20, 20A, 20B) or the guide member (sheet guide member 10, 10A, 10B), the retaining shape (widened portion 12) preventing the display tray (display sheet 20, 20A, 20B) from slipping off the hole (sheet guide portion hole 11a, 15a, 16a) in the guide member (sheet guide member 10, 10A, 10B) and from being detached from the guide member (sheet guide member 10, 10A, 10B), when the display tray (display sheet 20, 20A, 20B) is pulled out.

This makes it possible to prevent the display tray from slipping off the hole in the guide member and being detached from the guide member, when the display tray is pulled out. Examples of the retaining shape encompass: (i) a shape arranged such that the forward end portion of the guide section in the direction in which the display tray is pulled out has a width larger than an inside dimension width of a hole in the display tray which hole will be described below and (ii) a shape arranged such that a rear end portion of the display tray in the direction in which the display tray is pulled out has a width larger than an inside dimension width of the hole in the guide member.

A portable terminal (mobile phone 1A, 1B, 1C) in accordance with Aspect 4 of the present invention is configured preferably such that, in the portable terminal described in any one of Aspects 1 to 3, the display tray (display sheet 20, 20A, 20B) is provided with a hole (rear end guide hole 23a, 24a, 25a) such that the display tray (display sheet 20, 20A, 20B) moves along a lengthwise direction of the display tray (display sheet 20, 20A, 20B) in a state in which the guide member (sheet guide member 10, 10A, 10B) is put through the hole (rear end guide hole 23a, 24a, 25a), the hole (rear end guide hole 23a, 24a, 25a) in the display tray (display sheet 20, 20A, 20B) being provided at a rear end portion of the display tray (display sheet 20, 20A, 20B) in the direction in which the display tray (display sheet 20, 20A, 20B) is pulled out.

In the above configuration, the hole in the display tray is provided at the rear end portion of the display tray in the direction in which the display tray is pulled out. Then, when the display tray is retracted, the hole in the display tray moves along the guide member. As a result, when the display tray is retracted, the display tray moves to a rear side along the guide member. This makes it possible to store the display tray inside the housing in a state in which the display tray is not slanted.

A portable terminal (mobile phone 1A, 1B) in accordance with Aspect 5 of the present invention is configured such that, in the portable terminal described in any one of Aspects 1 to 4, the guide member (sheet guide member 10) is fixed to a sub-antenna 5.

Since an area of the sub-antenna is large, the above configuration makes it possible to easily store the display tray and the guide member even in a case where the display tray and the guide member are large.

A portable terminal (mobile phone 1A, 1B) in accordance with Aspect 6 of the present invention is configured such that, in the portable terminal described in any one of Aspects 1 to 5, the guide member (sheet guide member 10) is fixed to the housing (sub-antenna 5) at least at a rear end portion of the guide member (sheet guide member 10) in the direction in which the display tray (display sheet 20) is pulled out. Note that a tape, other adhesive, or the like can be used as a fixing means.

In the above configuration, the guide member is fixed to the housing at least at the rear end portion of the guide member. This makes it possible to store the display tray inside the housing in a state in which the display tray is not slanted.

A portable terminal (mobile phone 1C) in accordance with Aspect 7 of the present invention is configured such that, in the portable terminal described in any one of Aspects 1 to 4: the display tray (display sheet 20) and the guide member (sheet guide member 10) are provided between a display panel (liquid crystal display section 2) and a circuit board (electronic circuit board 4).

In an aspect of the present invention, since the display tray and the guide member is thin and flexible, the above configuration makes it possible to provide the display tray and the guide member between the display panel and the circuit board, and the display tray and the guide member need not necessarily be provided in the sub-antenna.

Note that the present invention is not limited to the above embodiments, but can be altered within the scope of claims by a skilled person in the art. The present invention also encompass, in the technical scope, any embodiment derived by combining technical means disclosed in differing embodiments. Further, a new technical feature can be formed by combining technical means disclosed in the embodiments.

REFERENCE SIGNS LIST 1A, 1B, 1C mobile phone (portable terminal)
2 liquid crystal display section (display panel)
3 front cabinet (housing)
3a opening
4 electronic circuit board (circuit board)
4c card connector
5 sub-antenna (housing)
5b depression
6 back cabinet (housing)
10, 10A, 10B sheet guide member (guide member)
11, 15, 16 sheet guide portion
11a, 15a, 16a sheet guide portion hole (hole in guide member)
12 widened portion (retaining shape)
20, 20A, 20B display sheet (display tray)
21 bar code (identification information)
23, 24, 25 rear end guide
23a, 24a, 25a rear end guide hole (hole in display tray)
31 positioning pin
41 single-sided tape
42 pin

The invention claimed is:

1. A portable terminal comprising:
a display tray displaying identification information, the display tray being made of a flexible band-shaped sheet member and incorporated in a housing, the identification information being viewable to a user when the display tray is pulled out from the housing; and
a guide member for guiding the display tray along a direction in which the display tray is pulled out, the guide member guiding the display tray so as to allow the display tray to be pulled out from the housing, wherein
the guide member is made of a flexible band-shaped sheet member; and
the guide member is provided with a hole through which the display tray moves along a lengthwise direction of the display tray, the hole in the guide member being provided at a forward end portion of the guide member in the direction in which the display tray is pulled out.

2. The portable terminal as set forth in claim 1, wherein:
a retaining shape is formed in at least the display tray or the guide member, the retaining shape preventing the display tray from slipping off the hole in the guide member and from being detached from the guide member, when the display tray is pulled out.

3. The portable terminal as set forth in claim 1, wherein:
the guide member is fixed to a sub-antenna.

4. The portable terminal as set forth in claim 1, wherein:
the guide member is fixed to the housing at least at a rear end portion of the guide member in the direction in which the display tray is pulled out.

5. The portable terminal as set forth in claim 1, wherein:
the display tray and the guide member are provided between a display panel and a circuit board.

6. A portable terminal comprising:
a display tray displaying identification information, the display tray being made of a flexible band-shaped sheet member and incorporated in a housing, the identification information being viewable to a user when the display tray is pulled out from the housing; and
a guide member for guiding the display tray along a direction in which the display tray is pulled out, the guide member guiding the display tray so as to allow the display tray to be pulled out from the housing, wherein:
the display tray is provided with a hole such that the display tray moves along a lengthwise direction of the display tray in a state in which the guide member is put through the hole, the hole in the display tray being provided at a rear end portion of the display tray in the direction in which the display tray is pulled out.

7. The portable terminal as set forth in claim 6, wherein:
the guide member is fixed to a sub-antenna.

8. The portable terminal as set forth in claim 6, wherein:
the guide member is fixed to the housing at least at a rear end portion of the guide member in the direction in which the display tray is pulled out.

9. The portable terminal as set forth in claim 6, wherein:
the display tray and the guide member are provided between a display panel and a circuit board.

* * * * *